United States Patent [19]
Holbrook

[11] Patent Number: 5,456,647
[45] Date of Patent: Oct. 10, 1995

[54] END OF LINE VOLUME LEARN SEQUENCE OF FRICTION ELEMENT FILL VOLUMES FOR AUTOMATIC TRANSMISSION

[75] Inventor: Gerald L. Holbrook, Rochester Hills, Mich.

[73] Assignee: Chrysler Corporation, Highland Park, Mich.

[21] Appl. No.: 67,526

[22] Filed: May 24, 1993

[51] Int. Cl.⁶ .......................... B60K 41/18; F16D 43/30
[52] U.S. Cl. ..................... 477/154; 477/155; 364/424.1
[58] Field of Search ....................... 74/366 R; 475/120, 475/123; 477/154, 155; 364/424.1

[56] References Cited

U.S. PATENT DOCUMENTS

| | | |
|---|---|---|
| 4,044,634 | 8/1977 | Florus et al. . |
| 4,244,244 | 1/1981 | Rembold et al. . |
| 4,501,171 | 2/1985 | Muller et al. . |
| 4,527,448 | 7/1985 | Person et al. . |
| 4,653,350 | 3/1987 | Downs et al. . |
| 4,667,540 | 5/1987 | Yagi . |
| 4,671,139 | 6/1987 | Downs et al. . |
| 4,680,988 | 7/1987 | Mori . |
| 4,707,789 | 11/1987 | Downs et al. . |
| 4,724,723 | 2/1988 | Lockhart et al. . |
| 4,790,418 | 12/1988 | Brown et al. . |
| 4,899,858 | 2/1990 | Coté et al. ............. 192/0.092 X |
| 4,951,200 | 8/1990 | Leising et al. . |
| 4,982,620 | 1/1991 | Holbrook et al. ............. 74/731.1 |
| 4,989,471 | 2/1991 | Bulgrien ............. 74/336 R |
| 5,082,097 | 1/1992 | Goeckner et al. ............. 192/32 |
| 5,216,606 | 6/1993 | Lentz et al. ............. 364/424.1 |
| 5,224,577 | 7/1993 | Falck et al. ............. 74/336 R |

FOREIGN PATENT DOCUMENTS 0231593  8/1987  European Pat. Off. .

Primary Examiner—John E. Ryznic
Attorney, Agent, or Firm—Mark P. Calcaterra

[57] ABSTRACT

The present invention provides improved initial shift quality in an electronically controlled automatic transmission by enabling the friction element fill volumes to be "learned" by the transmission controller before the vehicle leaves the assembly line. An end of line (EOL) volume learn procedure is intended for final check out at car assembly or for other appropriate circumstances such as for service after a transaxle has been rebuilt or replaced, or as a diagnostic tool to help confirm an indicated condition of an element. Upon satisfaction of a set of initial conditions, an end of line volume learn procedure is initiated wherein the transmission is cycled through a number of phases, each phase generally corresponding to the application of a different friction element. In other words, each element is applied or logically turned "ON" until a predetermined change in the amount of separation between engine speed and turbine speed (slip) is identified, thereby indicating the apply point of the respective element. Various parameters are measured as each element is applied and released, these parameters being used to calculate an initial fill volume. The initial fill volume of each element is stored in RAM memory for use by the transmission controller when the vehicle is actually driven for the first time.

30 Claims, 3 Drawing Sheets

END OF LINE VOLUME LEARN SEQUENCE OF FRICTION ELEMENT FILL VOLUMES FOR AUTOMATIC TRANSMISSION

BACKGROUND OF THE INVENTION

1. Field of the Invention

The present invention relates generally to an electronically controlled automatic transmission capable of independently learning the fluid fill volumes of its friction elements and, more particularly, to a volume learn sequence which enables the transmission to learn these volumes before the vehicle has been driven.

2. Discussion

Land vehicles generally require three basic components: an engine, a power train and wheels. The engine produces force by converting chemical energy contained in a liquid fuel into the mechanical energy of motion. The power train transmits this resultant force to the wheels to provide movement of the vehicle. The main component of the power train is the transmission which converts engine torque and speed in accordance with the tractive-power demand of the vehicle. The transmission also controls the direction of rotation applied to the wheels so that the vehicle may be driven both forward and backward. A torque converter transmits power from the rotating engine crankshaft to the input member of the transmission.

One advanced type of transmission is a four speed electronically controlled automatic transmission with overdrive. One example of an electronic automatic transmission of this type is described in U.S. Pat. No. 4,875,391, entitled "An Electronically-Controlled, Adaptive Automatic Transmission System", issued on Oct. 24, 1989 to Leising et al. This patent is owned by the Assignee of the present application and is incorporated herein by reference. However, it should be appreciated that the principles of the present invention are not limited to any particular electronically controlled automatic transmission, and that the present invention may be applicable to a wide variety of other similar powertrain configurations.

In this type of electronic automatic transmission, a series of clutches or friction elements provide a means for application and release of separate members to and from each other during the flow of power through the transmission. These clutches thereby constitute the means by which gears within the transmission are selectively engaged or disengaged from either the engine crankshaft or the transmission case. Four speed transmissions of this type generally include four elements or clutches which are applied or engaged in various combinations in relation to each of the vehicle's gears. Those in the present transmission include an underdrive clutch (applied in first, second and third gears), an overdrive clutch (applied in third and fourth gears), a two/four shift clutch (applied in second and fourth gears) and a low/reverse clutch (applied in first and reverse gears). Each of these clutches generally includes a plurality of alternating clutch plates and clutch disks which, when applied, engage one another and which, when the clutch is not applied, are free to move or rotate relative to each other.

To apply each of these clutches, an electronically controlled hydraulic fluid actuating device such as a solenoid-actuated valve is used. There is typically one valve for each clutch, an underdrive clutch solenoid-actuated valve, an overdrive clutch solenoid-actuated valve, a two/four shift solenoid-actuated valve and a low/reverse solenoid-actuated valve. These valves each control fluid flow to a respective clutch apply cavity. The flow of fluid into a clutch apply cavity results in the application or engagement of that clutch. Fluid flow is enabled by the opening of the solenoid-actuated valve in response to command or control signals received by the solenoid from an electronic control system.

The electronic control system typically includes a microcomputer-based transmission control module capable of receiving input signals indicative of various vehicle operating conditions such as engine speed, torque converter turbine speed, output speed (vehicle speed), throttle angle position, brake application, predetermined hydraulic pressures, a driver selected gear or operating condition (PRNODDL), engine coolant temperature and/or the ambient air temperature. Based on the information contained in these signals, the controller generates command or control signals for causing the actuation of each of the solenoid-actuated valves which regulate the application and release of fluid pressure to and from the apply cavities of the clutches or frictional units of the transmission. Accordingly, the controller is programmed to execute predetermined shift schedules stored in a memory of the controller through appropriate command signals to the solenoid-actuated valves.

Although in the manufacture of such transmissions each of the transmission components is machined to precise predefined dimensions, manufacturing tolerances or build variations often result in components having slightly larger or smaller dimensions. This may ultimately affect the hydraulic fluid fill volumes of each of the various clutches, or in other words, the volume of fluid which must be displaced to effectively apply or engage that clutch. These fluid fill volumes are used by the electronic transmission controller to effectively control fluid application to each element in order to provide an optimum shift quality or feel.

After a transmission is manufactured, a nominal fill volume for each element may be stored in a permanent non-volatile memory location within the transmission controller for use in effectively controlling this fluid flow. The transmission controller uses this stored value in controlling fluid application to each of the clutches. However, as discussed above, this stored nominal valve may deviate from the actual fill volume due to build variations or component wear. This information is used by the transmission controller in carrying out its shifts and therefore may result in a less than optimum shift quality.

The controller of a transmission of the type to which the present invention is directed, therefore, is programmed to update this originally stored value or "learn" from the results of its operation. The nominal volume value is stored in a non-volatile memory location but a learned volume value is stored for use by the transmission control logic in a battery backed RAM. This learned value is continuously updated as the vehicle is driven and is thereafter used by the transmission controller to precisely control fluid flow and fully optimize shift quality. A transmission having this capability is described in detail in U.S. Pat. No. 4,982,620 to Holbrook, et al. This patent is also assigned to the Assignee of the present application and is also incorporated herein by reference.

However, this "learning" currently only takes place when the vehicle is driven, and therefore does not impact initial shift quality, or the shift quality the first time the vehicle is actually driven. There is therefore a need for a means by which these hydraulic fluid fill volumes can be learned prior to the vehicle being driven.

SUMMARY OF THE INVENTION

The present invention provides improved initial shift quality by allowing the element fill volumes to be "learned" by the transmission controller before the vehicle leaves the assembly line. An end of line (EOL) volume learn procedure is intended for final check out at car assembly or for other special circumstances such as for service after a transaxle has been rebuilt or replaced, or as a diagnostic tool to help confirm an indicated condition of an element.

Upon satisfaction of a set of initial conditions, an end of line volume learn procedure is initiated wherein the transmission is cycled through a number of phases, each phase corresponding to the sequential application of a different clutch. In other words, each element is applied or logically turned "ON" until a predetermined change in the amount of separation between engine speed and turbine speed (slip) is identified, thereby indicating the apply point of the respective element. Various parameters are measured as each element is applied and released, these parameters being used to calculate an initial fill volume for that element. The initial fill volume of each element is stored in random access memory (RAM) for use by the transmission controller when the vehicle is actually driven for the first time.

Additional objects, advantages, and features of the present invention will become apparent from the following description and appended claims, taken in conjunction with the accompanying drawings.

DESCRIPTION OF THE PREFERRED EMBODIMENT

Figure 1:
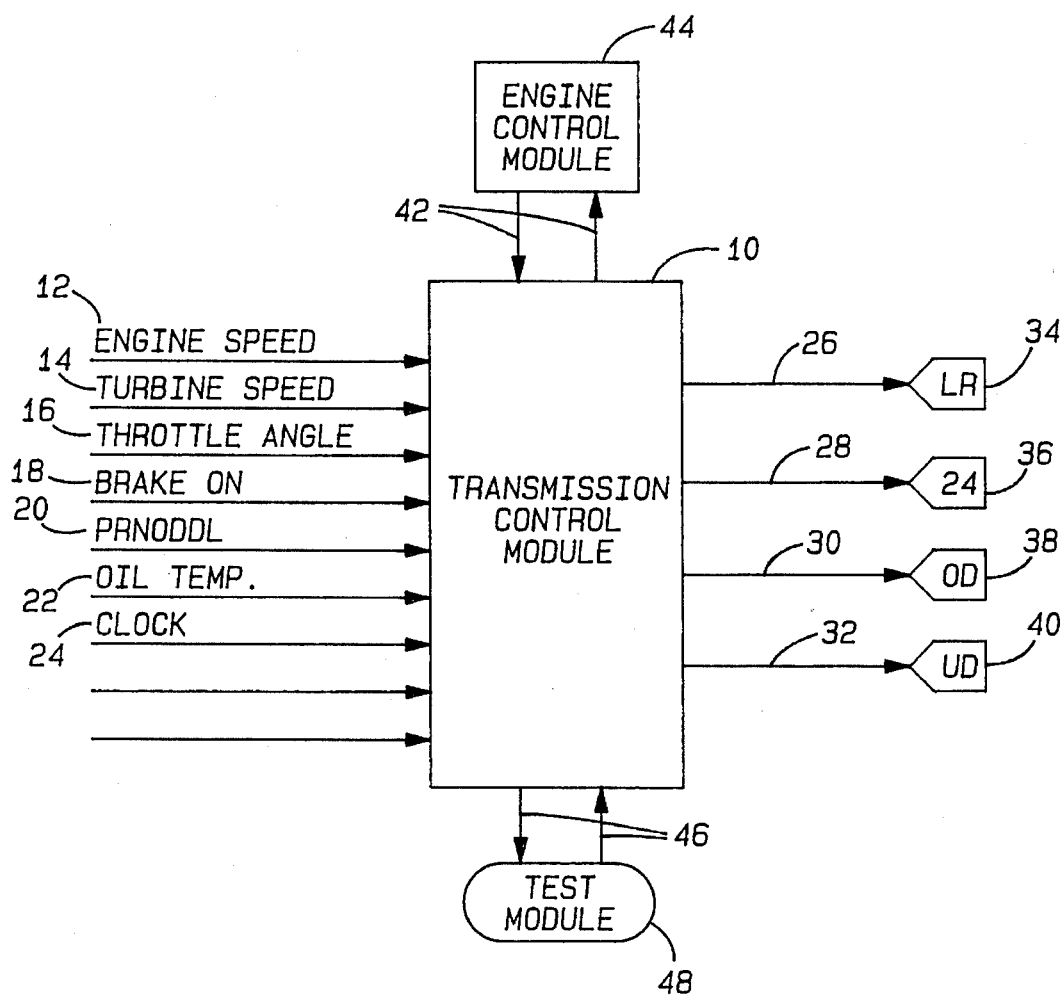
FIG. 1 is a schematic diagram illustrating the transmission control system used to perform the EOL volume learn sequence of the present invention.

Referring now to FIG. 1, the end of line (EOL) fill volume learn sequence of the present invention is a programmed sequence carried out predominantly by a microprocessor-based transmission control module 10. Control module 10 preferably includes processor means and random access as well as non-volatile memory. Control module 10 also is adapted to interact as necessary with other vehicle electronic control modules.

Module 10 receives as inputs a number of electrical signals including a signal indicative of engine rotational speed 12, torque converter turbine rotational speed 14, throttle angle position 16, brake application 18, the gear or operating condition (PRNOODL) 20, engine oil temperature 22 and a timing clock 24. Each of these signals may be provided by one or more vehicle sensing devices (not shown) as commonly known to those skilled in the art.

The transmission control module 10 has among its outputs means for applying an energizing signal to each of four solenoid actuating valves via buses 26, 28, 30 and 32. An energizing signal, or the absence of an energizing signal, on these buses causes the application and release of the associated frictional elements of the system by the underdrive (UD) clutch valve 40, overdrive (OD) clutch valve 38, two/four shift (24) clutch valve 36 and low/reverse (LR) clutch valve 34.

Each clutch has a logical "ON" (applied) and a logical "OFF" (released) position. In the transmission of the presently preferred embodiment both the underdrive clutch and two/four shift clutch are designed to be normally applied. This means that in the absence of electrical power, the underdrive solenoid-actuated valve 40 and the two/four shift solenoid-actuated valve 36 will allow pressure or fluid flow into the underdrive clutch apply cavity and the two/four clutch apply cavity. The overdrive and low/reverse clutches, on the other hand, are designed to be normally vented. In the absence of electrical power, the overdrive and low/reverse valves will vent, preventing fluid flow to the overdrive and low/reverse clutch apply cavities. Although the learn sequence of the present invention will be described using these normally applied or vented positions, it should be readily apparent that the learn sequence disclosed herein could be also applied to transmissions having clutches of different normal positions or to those having a different configuration of friction elements, a different number of gears or one or more free wheeling clutches.

The transmission control module 10 further preferably includes a bus 42 for receiving electrical signals from and transmitting signals to an engine control module 44. Also, a bus 46 enables communication with a test module or station 48.

Figure 2:
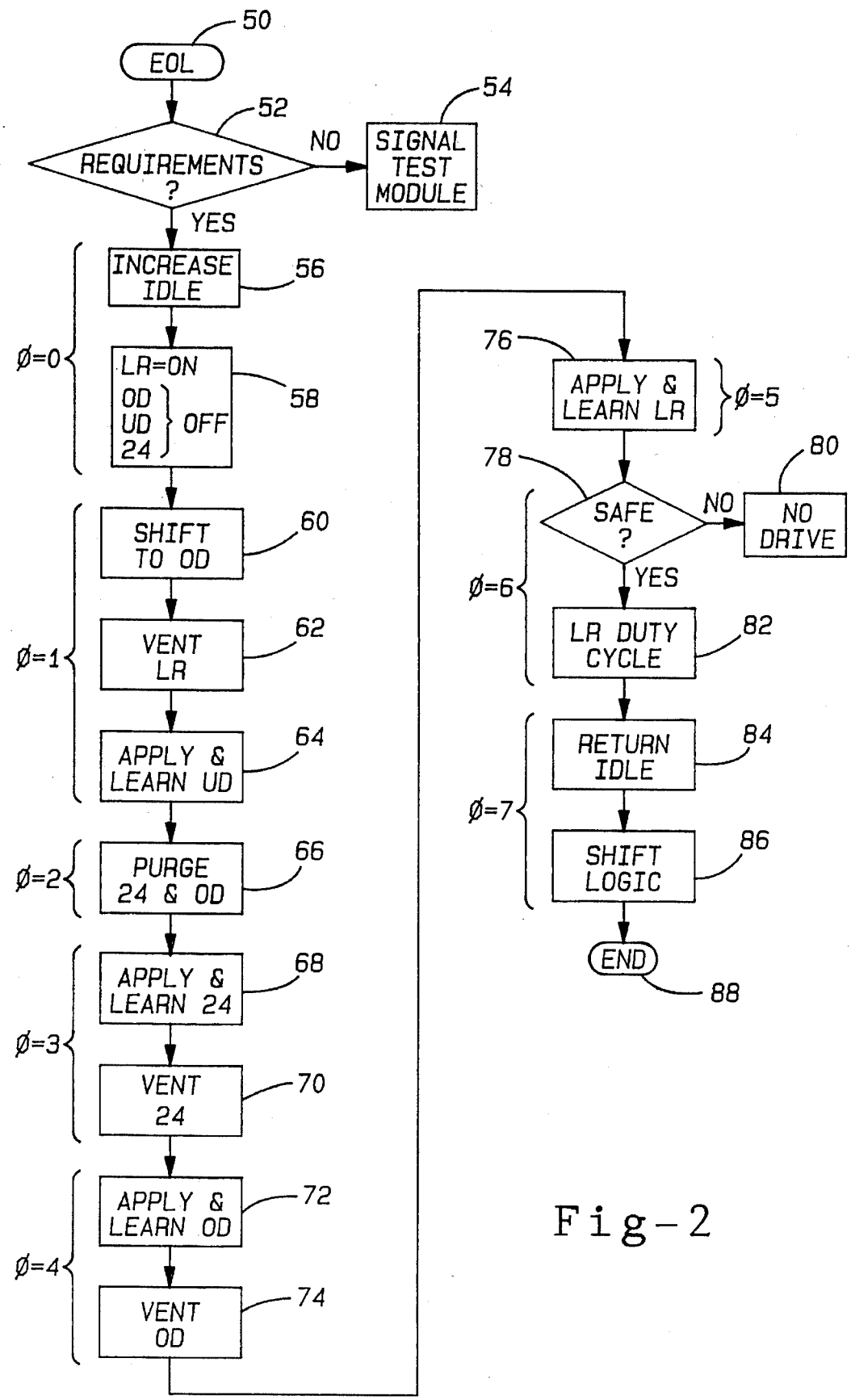
FIG. 2 is a flow chart illustrating the fundamental steps of the EOL volume learn sequence procedure of the invention.

Referring now to FIG. 2, the flow chart shown therein illustrates the fundamental steps of the EOL learn sequence of the present invention, as performed by the control system of FIG. 1. After the beginning the EOL volume learn sequence at bubble 50, a number of conditions or initial requirements must be met at diamond 52 in order for the volume learn procedure to advance to block 56. If any of the requirements of diamond 52 are not met, the sequence will not begin and, as indicated by block 54, a signal will be sent to the test module 48 on bus 46 conveying this information to the test operator. Each of these initial conditions or requirements is described below.

Initial Requirements

In order for the learn sequence to commence, the transmission control module 10 must receive as an input an EOL request from test module 48. This request preferably is an appropriate electrical signal received from the test module 48 which has been plugged directly or indirectly into the transmission control module 10. This portable piece of test equipment is typically available at the rolls test at the end of the vehicle assembly line or to a dealer or mechanic, such as the DRBII unit. The EOL request signal must be received continuously both before and throughout the test. The EOL request is continuously monitored in a background routine by the controller 10 and if at any time the EOL ceases being requested, the learn process is interrupted and the EOL sequence is aborted.

If an EOL sequence has not yet commenced, a PRNODDL code signal 20 must indicate that the vehicle shift lever is physically in a neutral position in order for the sequence to begin. This signal 20 is also continuously monitored in a background routine by controller 10 and if the EOL has already begun and is currently running, the PRNOODL signal must thereafter indicate that the shift lever is in an overdrive position. This confirms to the control module 10 during the learn sequence that the transmission is in the overdrive gear and is not between gears.

For the EOL sequence to begin or continue, the oil temperature must also be greater than a predetermined temperature, preferably 60° F. The oil temperature may be indicated directly as signal 22 or calculated by the controller 10 based on other known or sensed parameters. The brake must also be continuously applied, as indicated by input signal 18. Similarly, the engine speed (input signal 12) must be higher than a preset limit, preferably 500 rpm and the throttle angle (input signal 16) must be less than or equal to a set amount such as 3°. As long as these conditions are continuously met, an EOL learn sequence will be enabled, that is, allowed to commence or continue. If one of these conditions ceases to be met, the EOL sequence is interrupted and an abort process as described below is invoked.

Once begun, the EOL learn sequence preferably comprises seven phases, from phase 0 ($\emptyset=0$) to phase 7 ($\emptyset=7$). The sequence progresses from phase to phase, in order, until the entire sequence has been completed or aborted. The purpose of the various phases is to effect sequential application of each of the clutch elements in an order which ensures a separation between rotational engine speed and turbine speed (slip). The rate of this separation is used to recognize the point of application of an element in order to calculate the fluid fill volume of that element.

The elements are applied and released in a predefined sequence until the fill volume of each is learned. The cooperative application of elements in sequence in effect creates the beginning of a shift from one gear into another gear. This in turn causes the turbine speed to be pulled down relative to the engine speed. This is because the brake is applied for the duration of the learn sequence, as required in diamond 52, and therefore the vehicle output speed is kept at 0 miles per hour.

During the entire EOL learn sequence, as well as thereafter, the fill volume ($V_f$) of each of the four elements is continuously monitored by the transmission control module 10. An instantaneous fill volume $V_f$ is calculated for each element, in time increments of $\delta t$, as:

$$V_f = V_o + Q \cdot \delta t$$

where $V_o$=previous value of $V_f$
Q=flow rate
$\delta t$=time increment

In the presently preferred embodiment, $\delta t$=14 milliseconds and $V_0$ is therefore the value of $V_f$ calculated 14 milliseconds ago.

The steps in each of the phases of the EOL sequence, as applied to the automatic transmission described in the patent incorporated by reference herein, are shown in the flow chart of FIG. 2. However, the overall purpose behind each step as described above should be kept in mind as the concept contained in the steps detailed below, with some minor modification, are equally well suited for application to various other types and configurations of transmissions.

Figure 3:
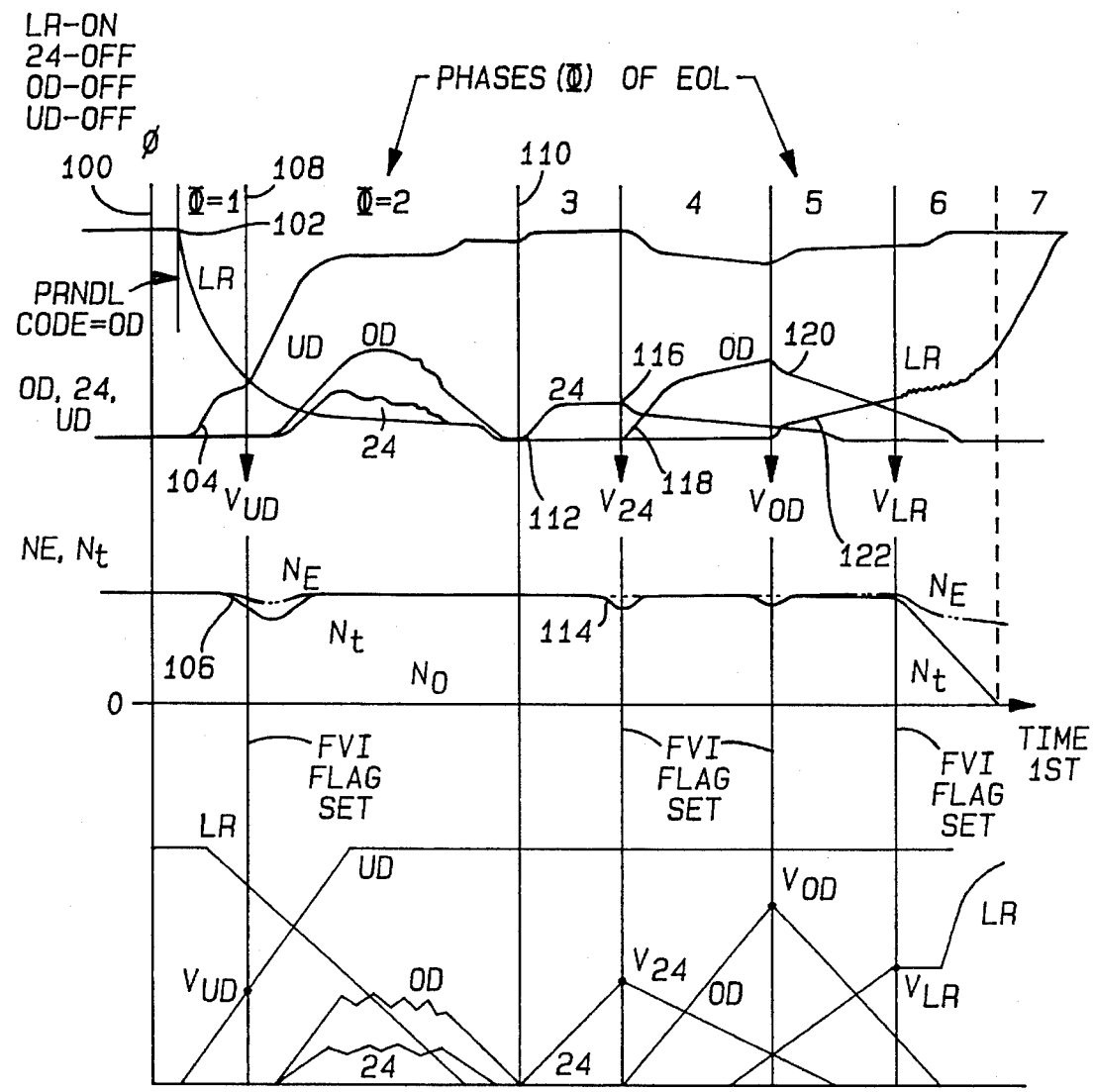
FIG. 3 is a graphic illustration illustrating learn sequence timing.

Attention is also drawn to the graph of FIG. 3 which illustrates relative phase timing. Shown in the center plot of the graph is engine speed ($N_e$), turbine speed ($N_t$) and output speed ($N_0$) with respect to time. Plotted above is the corresponding pressure in the LR, UD, OD and 24 shift fill cavities. The fluid fill volume of each element is shown in the bottom plot and, as shown therein, volume as a general rule generally tracks the pressure curve. The current fill volume of each element is tracked continuously by the transmission control module 10 every $\delta t$, or 14 m sec.

Phase 0

Phase 0 begins at block 56 with the transmission control module 10 issuing a command signal on bus 42 to the engine control module 44 to increase the target engine idle speed to 1000 rpm for the duration of the EOL sequence. This ensures that source pressure or line pressure from the transmission pump remains at a preset regulated level. The transmission controller 10 at block 58 then sends appropriate electrical energizing signals as necessary over buses 26, 28, 30 and 32 to each of the solenoid-actuated valves in order to turn the LR clutch logically ON and the 24 shift, OD and UD clutches logically OFF.

In the transmission of the presently preferred embodiment, since the UD clutch and 24 shift clutch are normally applied, and the OD and LR clutches are normally vented, this means applying an energizing signal over bus 26 to LR valve 34, over bus 32 to UD valve 40 and over bus 28 to 24 valve 36. A "start" signal may also be sent to the test module 48 to inform an operator of the test module or a driver of the vehicle to physically shift the transmission from neutral to overdrive via the vehicle shift lever.

Phase 1

The physical shift into overdrive at block 60 begins phase 1 of the EOL sequence. (See also reference numeral 102 in FIG. 3). At block 62 the LR clutch is then vented or turned logically OFF. The normally applied UD clutch is applied at block 64 and both pressure and volume build. (See reference numeral 104). The UD clutch is applied in the presently preferred embodiment by interrupting the energizing signal transmitted to UD valve 40 on bus 32.

The displaced fluid volume ($V_f$) of the UD clutch is continuously tracked and, upon the recognition of the application of the UD element, a Fill Volume Identified (FVI) flag is set and an instantaneous fill volume of the UD clutch ($V_{UD}$) may be obtained. After this flag is set, the fill volume of the UD clutch VFL (UD) can be calculated as:

$$VFL(UD) = C_f V_{UD}$$

wherein $C_f$ is an appropriate correction factor based on actual test data as described in detail below and $V_{UD}$ is the captured instantaneous fill volume of the UD clutch at the moment the FVI flag is set. (See reference numeral 108).

The Fill Volume Identified (FVI) flag is preferably set based upon a rotational speed difference between the turbine speed ($N_t$) and engine speeds ($N_e$), or the slip (S):

$$S = N_e - N_t$$

The FVI flag is preferably set based upon a predefined change or increase in the amount of slip ($\delta S$) as calculated by the transmission control module 10 using signals 12 and 14. In this embodiment, the FVI flag is set wherein the change in slip ($\delta S$) exceeds 6 rpm and wherein the current slip (S) exceeds a minimum slip ($S_m$) plus 40 rpm:

FVI SET: $\delta S > 6$ rpm and $S > S_m + 40$ rpm

The sequence shown ensures that this slip occurs by ensuring that there is another element applied at the time an element is learned. As shown in FIG. 3, in phase 1 the LR clutch still has a slight capacity at the moment the FVI flag (see numeral 108) is set and the UD clutch is applied and learned. This is necessary to create the requisite pressure and resulting separation between the engine and turbine speeds used in this embodiment to recognize the point of application of a clutch element. The UD clutch thereafter remains in an applied position building up both pressure and volume. The FVI flag, after being set in learning each fill volume, is reset.

Figure 4:
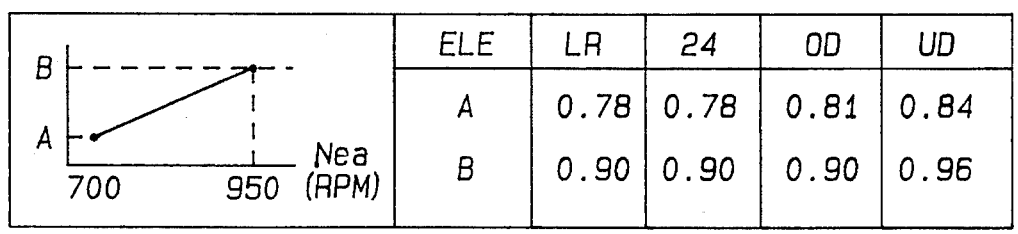
FIG. 4 is a graphic illustration, supplemented by a chart, used in determining a fluid fill volume correction factor.

The calculation of the correction factor $C_f$ for any given fill volume can be best understood with the aid of FIG. 4. The correction factor is empirically determined based on test data obtained from actually learned fill volumes. The correction factor compensates for pump capacity variation and is calculated based on the average engine rpm during the learn sequence ($N_{ea}$) wherein:

$N_{ea}=0.5(N_{ei}+N_{ef})$ and $N_{ei}=N_e$@start of learn $N_{ef}=N_e$@end of learn These values are read by transmission controller 10 from signal 12 at the starting point and ending point of the learning process for that element. The "start of learn" is taken to be the time at which the learned element is logically turned ON and the fill sequence begins. The "end of learn" is the time at which the FVI flag is set and the fill volume for that element is learned.

The $N_{ea}$ calculated for a given fill volume measurement is mapped onto the graph shown in FIG. 4. This can be accomplished digitally through the use of an interpolation routine or using a look up table. For reference purposes, correction factors for an $N_{ea}$ of 700 rpm (A) and 950 rpm (B) are shown in the corresponding table. The theory behind the calculation of this correction factor is that when the average engine rpm is low, a higher relative fill volume is learned due to a lower pressure and, to compensate for this, a lower percentage of the measured value should be learned and stored.

To prevent an incorrectly calculated fill volume from affecting shift quality, controller 10 may be programmed to accept and record in RAM only a learned fill volume, VFL (UD) in this phase, within a predefined difference from the stored nominal build volume, or within a defined "acceptable" range. The same is true regarding the remaining volumes learned in the remaining phases discussed below.

Phase 2

Phase 2 in block 66 simply requires that air be purged from the 24 shift and OD elements. This purge includes not only the clutch apply cavities but also air trapped in any hydraulic lines or air entrapped in the hydraulic fluid itself. The purpose for this purge is to provide accurate fill volume measurements which are not corrupted by the measurement of the removal of air.

Phase 3

In phase 3, at block 68, the 24 clutch is applied and may be learned in the same fashion described above in conjunction with the UD clutch in phase 1. The 24 shift clutch is applied via an energizing signal on bus 28 applied to the 24 shift solenoid-actuated valve 36. VFL (24) is set to the instantaneous tracked fill volume for the 24 element upon the setting of a VFI flag, again multiplied by an appropriate correction factor, calculated as described above:

$VFL(24)=C_f V_{24}$

The updated value is stored in random access memory RAM memory of controller 10. The 24 shift clutch is then vented in block 70 and remains in a vented state throughout the remaining phases.

Phase 4

In phase 4, at block 72, the OD clutch is turned logically ON and its fill volume can be learned in same manner as above. (See also reference numeral 118 in FIG. 3). VFL (OD) is set as follows when the FVI flag is set:

$VFL(OD)=C_f V_{OD}$

The OD clutch is then vented at block 74. (See numeral 120).

Phase 5

The LR clutch is turned ON and learned at block 76 in phase 5. VFL (LR) is set to $C_f V_{LR}$ when an FVI flag is set.

Phase 6

Phase 6 begins at diamond 78 immediately after block 76 in phase 5, or upon an abort condition caused by a failure of an initial condition. If the throttle and engine speed are low enough for safety purposes (throttle angle 24° and $N_e<1500$ rpm in the presently preferred embodiment, as obtained through signals 16 and 12) in diamond 78, phase 6 softens the entry into first gear with an LR duty cycle in block 82. The sequence may then proceed to phase 7, otherwise a no drive condition is maintained in block 80 by overriding the engagement or application of the LR clutch.

Phase 7

At block 84 phase 7 results in the controller 10 issuing a command signal on bus 42 to the engine controller 44 to return to a normal engine target idle speed (typically about 700 rpm). An "EOL sequence complete" signal may then be sent on bus 46 to the test module 48.

Abort Process

The abort process is initiated upon failure of one of the requirements described in conjunction with diamond 52. If one of these requirements ceases to be met and the PRN-ODDL code signal 20 indicates that the shift lever position is in overdrive, drive or low, the sequence immediately proceeds from the current phase to phase 6. If the shift lever position as indicated by PRNOODL code signal 20 is reverse or neutral, phase 7 is immediately effected. If desired, each phase may also be assigned a predefined time limit which, if exceeded, likewise triggers the abort process. In the sequence of the present embodiment phase 2 is allowed 0.8 seconds before a time out occurs and the remaining phases allowed 1.6 seconds each.

The graph of FIG. 3 best shows the relative timing of each phase. As shown therein the learn sequence begins at reference numeral 100 in phase 0 ($\theta=0$) with the LR clutch applied and the 24 shift, OD and UD clutches logically OFF. Phase 1 is initiated at 102 with the physical shift to overdrive and the venting of the LR clutch and, therefore, a decrease in LR clutch pressure and volume. Fluid flow to the UD clutch at 104 with concurrent slight remaining capacity in LR results in a build up in pressure which causes a separation between $N_e$ and $N_t$ at 106.

A learned fill volume for the UD clutch $V_{UD}$ can be calculated and learned after a change in this separation exceeds a predefined amount and an FVI flag is set. The UD clutch remains applied as air is purged from the OD and 24 shift elements in phase 2 at time 108. Phase 3 begins at time 110 and requires the application of the 24 shift element at 112 to obtain another separation 114 and $V_{24}$. The 24 clutch is then vented at 116 at the beginning of phase 4. The OD element is applied at 118. $V_{OD}$ is then learned at the conclusion of phase 4. In phase 5 the OD element has been vented at 120 and the LR clutch applied at 122 and $V_{LR}$ can then be obtained. Phases 6 and 7 results in a graceful duty cycle exit to put the transmission softly into first gear.

The foregoing discussion discloses and describes merely exemplary embodiments of the present invention. One skilled in the art will readily recognize from such discussion, and from the accompanying drawings and claims, that various changes, modifications and variations can be made therein without departing from the spirit and scope of the invention as defined in the following claims.

I claim:

1. In a vehicle having an engine and an automatic transmission system including a fluid actuating device being movable for applying at least one friction element, at least one solenoid-actuated valve being movable in response to the presence or absence of electrical power to the valve for directing fluid flow between a fluid source and the fluid actuating device, a controller receiving input signals indicative of predetermined conditions and having memory for processing and storing the input signals and predetermined values and providing output signals to control the solenoid-actuated valves, a method of manufacturing an automatic transmission comprising the steps of:

providing an automatic transmission in the vehicle;

applying a braking mechanism so as to prevent movement of the vehicle;

monitoring the speed of a turbine in a torque converter assembly;

monitoring the speed of the engine;

monitoring the instantaneous fluid volume of a friction element;

generating a learned volume value as a function of the instantaneous fluid volume when the change in the difference between the engine and turbine speed equals or exceeds a predefined limit; and storing the learned volume value in memory for use by the controller in controlling friction element application.

2. A transmission controller system for determining initial fluid volume for friction elements in an electronically controlled automatic transmission system having sensors for providing signals indicative of various vehicle operating conditions and a plurality of solenoid-actuated valves having logical operating states (ON and OFF) and being movable in response to the presence or absence of an electrical energizing signal to control of a fluid to cause application or release of a corresponding friction element, the transmission controller system comprising:

means for receiving an input electrical signal indicative of a vehicle braking mechanism being applied;

memory means for storing information;

electronic control means for performing calculations and generating output signals;

means for applying the output signals as the electrical energizing signals to the solenoid-actuated valves;

means for monitoring a sensed electrical signal indicative of the speed of a turbine in a vehicle torque converter assembly;

means for monitoring a sensed electrical signal indicative of the speed of the vehicle engine;

means for monitoring the instantaneous fluid volume of a friction element; and means for generating a learned volume value for the friction element as a function of the instantaneous fluid volume of the friction element when a change in the difference between engine and turbine speeds equals or exceeds a predefined limit.

3. The transmission controller system as defined in claim 2 wherein the electronic control means controls application of each friction element as a function of the learned volume value so as to achieve improved initial shift quality.

4. The transmission controller system as defined in claim 2 wherein said electronic control means compares the learned volume value with a stored fill volume so as to allow for adjustment of the stored fill volume.

5. The transmission controller system as defined in claim 2 wherein said memory means comprises random access memory (RAM).

6. In an electronic controller for an electronically controlled vehicle automatic transmission system having sensors for providing signals indicative of various vehicle operating conditions and a plurality of solenoid-actuated valves having logical operating states (ON and OFF) and being movable in response to the presence or absence of an electrical energizing signal to control flow of a fluid to cause application or release of a corresponding friction element, said electronic controller having means for receiving input signals from said sensors, memory means for storing information, processor means for performing calculations and generating output signals and means for applying said output signals to said solenoid-actuated valves, a method of improving initial shift quality of the transmission system comprising:

sensing an electrical signal indicative of a vehicle braking mechanism being applied;

turning each said friction element ON and OFF in a predefined sequence;

identifying the point of application of each said friction element when turned ON;

measuring a series of parameters;

using said parameters to calculate an initial fill volume for that element; and storing said initial fill volume in memory for use by the controller to control application or release of corresponding friction elements as a function of the initial fill volume.

7. The method of claim 6 wherein said sequence is adapted to ensure a difference between sensed electrical signals indicative of rotational engine speed and rotational turbine speed.

8. The method of claim 6 further comprising the steps of monitoring a first said sensed electrical signal indicative of engine speed and monitoring a second said sensed electrical signal indicative of the speed of a turbine of a vehicle torque converter assembly and wherein the point of application for an element is identified upon a predetermined amount of change in the difference between the engine speed and turbine speed.

9. The method of claim 8 wherein said predefined amount of change is approximately 6 rpm.

10. The method of claim 8 wherein said point of application is identified only if said speed difference exceeds a predetermined minimum amount.

11. The method of claim 10 wherein said predetermined minimum amount of speed difference is approximately 40 rpm.

12. The method of claim 6 wherein said learned fill volume for an element is set approximately equal to the instantaneous volume of that element when application of that element has been identified.

13. The method of claim 6 wherein said learned value is stored in said memory means transmission electronic controller when said learned value falls within a predetermined acceptable range.

14. In an electronic controller for an electronically controlled vehicle automatic transmission system having sensors for providing electrical signals indicative of various vehicle operating conditions and a plurality of solenoid-actuated valves having logical operating states (ON and OFF) and being movable in response to the presence or absence of an electrical energizing signal to control flow of a fluid to cause application or release of a corresponding friction element, said electronic controller having means for receiving input electrical signals from said sensors, memory means for storing information, processor means for performing calculations and generating output signals and means for applying said output signals as said electrical energizing signals to said solenoid-actuated valves, a method of controlling the automatic transmission system to achieve improved initial shift quality comprising the steps of:

sensing an electrical signal indicative of a vehicle braking mechanism being applied;

monitoring one said sensed electrical signal indicative of the speed of a turbine in a vehicle torque converter assembly;

monitoring one said sensed electrical signal indicative of the speed of the vehicle engine;

monitoring the instantaneous fluid volume of a friction element;

generating a learned volume value for said friction element as a function of the instantaneous fluid volume of the friction element when a change in the difference between engine and turbine speeds equals or exceeds a predefined limit;

storing the learned volume value in memory; and controlling the application of fluid to cause application of release of corresponding friction elements as a function of the learned volume value.

15. The method of claim 4 further comprising the step of satisfying a set of initial predetermined conditions prior to initiating said method.

16. The method of claim 15 wherein said predetermined conditions include receipt by said transmission electronic controller of an electrical signal indicative of a request for initiating said method, said electrical request signal being supplied by a test module operably coupled to said transmission electronic controller.

17. The method of claim 15 wherein said predetermined conditions include receipt by said transmission electronic controller of a sensed electrical signal indicative of the vehicle shift lever being in a neutral position prior to initiating the method.

18. The method of claim 17 wherein said predetermined conditions include receipt by said transmission electronic controller of a sensed electrical signal indicative of the vehicle shift lever being in an overdrive position during the controller's performance of said method.

19. The method of claim 15 wherein said predetermined conditions include receipt by said transmission electronic controller of a sensed electrical signal indicative of the vehicle transmission oil temperature being at or exceeding a predefined level.

20. The method of claim 19 wherein said predefined temperature level is approximately 60° F.

21. The method of claim 15 wherein said predetermined conditions include receipt by said transmission electronic controller of a sensed electrical signal indicative of the engine speed exceeding a preset limit.

22. The method of claim 21 wherein said preset engine speed limit is approximately 500 rpm.

23. The method of claim 15 wherein said predetermined conditions include receipt by said transmission electronic controller of a sensed electrical signal indicative of the throttle angle being less than or equal to a predefined angle.

24. The method of claim 23 wherein said predefined angle is approximately 3°.

25. The method of claim 14 wherein said method is repeated for each of said plurality of friction elements.

26. The method of claim 14 wherein the friction element having a fluid volume being learned is turned logically ON.

27. The method of claim 26 wherein said transmission electronic controller turns ON said friction element by outputting an electrical energizing signal to the solenoid-actuated valve corresponding to that element.

28. The method of claim 14 further comprising the step of storing said learned volume value in said transmission electronic controller memory means.

29. The method of claim 28 wherein said learned volume value is stored in memory means of said transmission electronic controller if said speed difference exceeds a predetermined minimum amount and said value falls within a predetermined acceptable range.

30. The method of claim 14 wherein said predefined speed change limit is 6 rpm.

* * * * *